United States Patent [19]

Paar et al.

[11] Patent Number: 4,727,098

[45] Date of Patent: Feb. 23, 1988

[54] MODIFIED EPOXY RESINS AND PROCESS FOR PRODUCING SAME

[75] Inventors: Willibald Paar; Michael Hönel, both of Graz, Austria

[73] Assignee: Vianova Kunstharz, A.G., Werndorf, Austria

[21] Appl. No.: 904,013

[22] Filed: Sep. 5, 1986

[30] Foreign Application Priority Data

Sep. 5, 1985 [AT] Austria ................................ 2591/85
Jul. 31, 1986 [AT] Austria ................................ 2060/86

[51] Int. Cl.⁴ ............................................. C08G 18/30
[52] U.S. Cl. ..................................... 523/414; 525/481; 525/452; 525/510; 528/73; 528/99; 528/106
[58] Field of Search ....................... 525/481, 452, 510; 528/73, 99, 106; 523/414

[56] References Cited

U.S. PATENT DOCUMENTS 4,568,709 2/1986 Paar et al. ............................ 523/414
4,614,783 9/1986 Daimer et al. ........................ 528/73

Primary Examiner—Maurice J. Welsh
Assistant Examiner—Sam A. Acquah
Attorney, Agent, or Firm—A. W. Breiner

[57] ABSTRACT

Modified cationic epoxy resins wherein phenols linked through modified urea groups are used to extend the chain of diepoxy resins are described. The modified cationic resins can be formulated as paints which exhibit excellent properties particularly when used for electrodeposition paints.

11 Claims, No Drawings

MODIFIED EPOXY RESINS AND PROCESS FOR PRODUCING SAME

FIELD OF INVENTION

This invention relates to modified cationic epoxy resins and to a process for producing modified cationic epoxy resins. More particularly the invention relates to cationic epoxy resins comprising the reaction product of a diepoxy resin reacted with substituted urea group containing aminoalkylated phenols so as to extend the chain of the diepoxy resin.

BACKGROUND OF INVENTION

Many attempts are made to extend or prolong the chain of an epoxy resin for the production of cationic resins, particularly for cationic resins used as binders for cationic electrodeposition (CED) in order to favorably influence the adhesion and flexibility of crosslinked films without adversely influencing the corrosion resistance. Thus, attempts to extend or prolong the chain length of epoxy resins with diphenols leading to an increase in molecular size of low molecular epoxy resins are described in U.S. Pat. Nos. 4,339,368 and 4,339,369, and in DE-OSS Nos. 23 39 398 or 25 31 960. According to the teachings of those patents, although an increase in molecular size is realized, no substantial influence on the adhesion or film-forming temperature is attained. As disclosed in DE-AS No. 19 30 949, the adhesion and the flexibility of a film can be imporved through partial esterification of epoxy resins with long chain monocarboxylic acids and/or dipolycarboxylic acids, such as the maleinized oils or maleinized polybutadienes, acidic alkyd resins, or copolymers. Further, according to U.S. Pat. Nos. 4,104,147 or 4,148,772, chain prolongation can be effected with cationic modified epoxy resins through reaction of such resins with polyols with at least two primary hydroxy groups, whereby the rupture voltage, the film-forming temperature, and the film flexibility, respectively, can be improved. Recently it has been established that the aforesaid modifications are not sufficient to meet the increasingly stringent requirements of coatings, particularly for use by the automobile industry.

According to more recent disclosures, the adhesion of cathodically deposited films can be improved if the cationic binders employed carry an amide structure. However, the method of introducing the amide structure is of essential importance, since, for example, aminoamide compounds or maleinized fatty acids and polyamines, such as are described in U.S. Pat. Nos. 4,274,989 or 4,036,795, show no improvement with respect to adhesion.

Another proposal for introducing amide and/or urea groups for the chain prolongation of an epoxy resin, effected through diamines carrying the urea or amide groups, is disclosed in EP-A No. 2-0 137 459. The basic groups responsible for the cationic character of the binders are introduced through additional amine functionally. In U.S. Pat. No. 4,563,515 carboxylic acid amide structures are introduced into an epoxy resin through special secondary amines which simultaneously convey to the molecule, either partially or totally, the cationic character necessary for water-dilutability. U.S. Pat. No. 4,568,709 uses aminoalkylated phenols for the preparation of self-crosslinking electrodeposition paint binders. More specifically, the patent discloses cathodically depositable electrodeposition paint binders comprising the reaction product of an epoxy resin with at least two epoxy groups with amines carrying primary amino groups and, optionally, with a carboxylic acid compound to provide an epoxy resin-amino adduct which is then reacted with a phenol and formaldehyde.

SUMMARY AND GENERAL DESCRIPTION OF INVENTION

It has now been found that an advantageous modification of diopoxy resins for use as cationic paint binders is accomplished by the introduction, through etherification, of phenols linked through modified urea groups so as to extend or prolong the chain of diepoxy resins. If the products carry basic groups, either as a result of groups on the modifying phenol or through further modification, they can be rendered water-dilutable through protonation and can serve as binders for cathodically depositable electrodeposition paint binders.

The present invention is thus directed to cationic epoxy resins modified through chain prolongation and to a process for making the modified resins, characterized in that a reaction product (A1) of two moles of an aminoalkylation product, carrying one NH-group, obtained through reaction of a phenol carrying at least one formaldehyde-reactive site, with a primary amine and formaldehyde and one mole of diisocyanate, or a reaction product (A2) of one mole of a substituted urea obtained from one mole of a diisocyanate compound and two moles of a primary amine, two moles of formaldehyde, and two moles of a phenol having at least one formaldehyde-reactive site, is reacted with (B) one mole per phenolic hydroxy group of a polyepoxy compound through etherification of the phenolic hydroxy groups, and (C) the remaining epoxy groups are reacted in known manner with amine compounds and/or carboxy compounds, with the condition or proviso that the final product carries basic nitrogen groups in a quantity correponding to an amine value of from about 35 to 150 mg KOH/g.

According to the invention, products are obtained which, on the one hand, do not contain saponifiable groups in the chain extending or prolonging moieties, and on the other hand contain substituted urea groups desired for improving the adhesion performance of resulting paint films.

Suitable phenols for the preparation of the chain prolonging molecule segments are compounds with at least one formaldehyde-reactive site. When using higher functional phenols, the products also carry crosslinking sites and can be used for the formulation of self-crosslinking binders. In addition to simple phenol, alkyl phenols, such as the butyl phenols and their homologues, diphenols and diphenylolalkanes, such as bis-(4-hydroxyphenyl)-methane or 2,2-bis-(4-hydroxyphenyl)-propane, bisphenol A, can be used.

Suitable primary amines for use according to the invention are the alkyl amines, preferably the higher homologues with 4 or more C-atoms, and the alkanol amines, such as monoethanol amine and homologues thereof. For the simultaneous introduction of basic groups in the form of tertiary amino groups in the chain prolonging element, advantageously primary-tertiary diamines such as the dialkylaminoalkylamines exemplified by dimethyl- or diethylaminopropylamine, and the like, can be used.

Formaldehyde can be used in any of the commercially available forms, preferably paraformaldehyde with a $CH_2O$-content of more than 90%, as a solution.

Suitable diisocyanates are commercially available products such as toluylene diisocyanate, isophorone diisocyanate, hexamethylene diisocyanate, trimethylhexamethylene diisocyanate, and the like, or reaction products of diols with diisocyanates in a mole ratio of 1:2.

The preparation of the intermediates (A1) is carried out in a first step through joint reaction of phenol, amine, and formaldehyde, at 80° to 130° C., the reaction water being removed azeotropically with an entraining agent. The further reaction with the isocyanate compound is carried out at 30° to 50° C., preferably in the presence of an aprotic solvent, the isocyanate compound being added in portions while cooling, until an NCO-value of zero is attained.

In the production of the intermediate products (A2), the amine is dissolved in an aprotic solvent and the diisocyanate is added at 30° to 60° C. while cooling. The reaction normally is finished at the end of the addition. After the addition of the formaldehyde and the phenol, the reaction is carried on at from 80° to 130° C., and the reaction water is entrained through azeotropic distillation.

The reaction of the chain prolonging or extending segments with the epoxy resins is carried out in known manner to obtain phenol-ether formation, the reaction being conducted advantageously at 90° to 120° C. in the presence of solvents and with the coemployment of basic catalysts, for example, 0.05 to 0.2% by weight (b.w.) of triethylamine.

The epoxy resins suitable for the process of the invention are the commercially available polyepoxy compounds, particularly the diepoxy compounds, as are obtained through reaction of polynuclear phenols, particularly bisphenol A or phenol novolaks and epichlorohydrin. Optionally other epoxy resins, for example those based on polyols, can be used. Products of the latter type are known to one skilled in the art and are described in the literature. The epoxy resins preferred for the present process are based on bisphenol A or phenol novolaks reacted with epichlorohydrin having an epoxy equivalent weight of from 180 to 1000.

The diepoxy resins are modified simultaneously with or after the reaction with the chain prolonging or extending elements through the introduction of basic groups, such as through epoxy-amine formation or through esterification with carboxy compounds of various structure. Unsaturated groups can be introduced, for example through reaction with semiesters of hydroxyacrylates with dicarboxylic acids. Basic groups may also be introduced through reaction of free hydroxy groups with basic monoisocyanates. Optionally, the modification can also be carried out prior to chain prolongation. Substantially all of the epoxy groups are to be reacted with the final product being substantially free of epoxy groups.

To obtain water-dilutability, the basic groups of the reaction product are partially or totally neutralized with acids, preferably formic acid, acetic acid, or lactic acid. For the degree of dilutability needed in practice, it is sufficient to neutralize from about 10 to 40% of the basic groups or use a quantity of about 20 to 60 milli-moles acid per 100 g resin solids. The binders are diluted with deionized water to the desired concentration. Optionally, prior to neutralization or dilution or in a partially diluted condition, the binders are combined with pigments, extenders, or other paint additives to give pigmented paints.

The formulation of such paints and their application in the electrodeposition process are known to one skilled in the art and described in the literature. When used as primers, the deposited films are cured at 150° to 170° C. for 10 to 30 minutes. If the binders do not have a sufficient degree of self-crosslinking structure, additional crosslinking agents, such as blocked isocyanates, transesterification hardeners, amino resins or phenolic resins can be coemployed. With suitable formulation the products can also be applied by other methods, such as dipping, roller coating, or spraying. Optionally, the binders can be processed in organic solvents.

PRESENTLY PREFERRED EMBODIMENTS

The following examples illustrate the invention without limiting its scope. Parts and percentages refer to weight, unless otherwise stated.

The following abbreviations are used in the examples:
DEA: Diethylamine
DEAPA: Diethylaminopropylamine
DMAP: Dimethylaminopropylamine
DOLA: Diethanolamine
EHA: 2-Ethylhexylamine
HA: n-Hexylamine
IBA: Isobutylamine
MEOLA: N-Methylethanolamine
MIPA: Monoisopropanolamine
BPA: Bisphenol A
BPF: Bisphenol F
DMP: 2,6-Dimethylphenol
NPH: Nonylphenol
NBP: n-Butylphenol
PH: Phenol
PF 91: Paraformaldehyde, 91%
IPDI: Isophoronediisocyanate
ODI: Reaction product of 1 mole 1,8-octanediol and 2 moles IPDI
TDI: Toluylenediisocyanate (commercial monomer blend
TMDI: Trimethylhexamethylenediisocyanate
EHX/TDI: Toluylenediisocyanate semiblocked with 2-ethylhexanol
EPH I: Diepoxy resin based on bisphenol A (epoxy equivalent weight about 475)
EPH II: Diepoxy resin based on bisphenol A (epoxy equivalent weight about 190)
CE: technical blend of glycidyl esters of 1,1-dimethyl-($C_7$–$C_9$)-alkane carboxylic acids
DMPS: dimethylol propionic acid
HE 1: Semiester of phthalic anhydride and hydroxyethyloxazolidine, 70% in DGDE (molecular weight 265)
HE 2: Semiester of tetrahydrophthalic anhydride and hydroxy ethylmethacrylate (molecular weight about 282)
BM 1: basic monoisocyanate of 1 mole of isophoronediisocyanate and 1 mole diethylethanolamine, 60% in MIBK (molecular weight 239)
DGDE: diethyleneglycol dimethylether
MIBK: methylisobutylketone
PGME: propyleneglycol monomethylether
X: xyylol NMP: N-methylpyrrolidone
Val: Equivalent weight in grams for the designated functional group and, accordingly, is equivalent to groups.

Preparation of the Chain Prolonging or Extending Elements Used According to the Invention Reaction Products Type (A1):

In a reaction vessel the phenol component and the amine in the weight ratios listed in Table 1, and an entraining agent for removing the reaction water, such as toluol, are heated to about 75° C. After addition of the formaldehyde, preferably in the form of paraformaldehyde, the temperature is slowly raised, until a continuous azeotropic distillation sets in. After removal of the calculated quantity of reaction water, the entraining agent is vacuum-stripped and the batch is dissolved in an aprotic solvent.

To the obtained solution, at 30° to 50° C., while cooling, the isocyaate is added in portions and the reaction is carried to an NCO-value of practically zero. The intermediate is diluted with the solvent listed in Table 1 to the listed solids content.

Reaction Products Type (A2):

According to the quantities listed in Table 1A, the amine (blend) and the solvent are charged to a reaction vessel. At 30° to 50° C., the diisocyanate is added continuously within 30 to 60 minutes while cooling. When the addition is finished, the batch is heated to 70° C. and paraformaldehyde is added. The batch is held at 70° to 80° C. and, after the addition of the phenol, the reaction water is removed azeotropically at the stated temperature with a suitable entraining agent, for instance toluol. After vacuum-stripping the entraining agent, the batch is diluted to the listed solids content.

EXAMPLES

Example 1

In a suitable reaction vessel 475 parts (1 Val) EPH I are dissolved in 204 parts PGME and reacted at 110° C. with 181 parts of intermediate ZP 1 (corresponding to 136 parts resin solids =0.2 moles) in the presence of 0.5 parts triethylamine as catalyst until the content of free epoxy groups corresponds to 0.6 moles. After cooling to 75° C., 26 parts (0.2 moles) DEAPA and 21 parts (0.2 moles) DOLA are added, and the reaction is carried on at 80° C. to an epoxy value of zero. The product is dissolved with 105 parts PGME to a solids content of 65% and has an amine value of 51 mg KOH/g.

Example 2

As described in Example 1, a blend of 190 parts (1 Val) EPH II and 475 parts (1 Val) EPH I, is dissolved in 222 parts PGME and reacted at 115° C. in the presence of 1.0 part triethylamine with 461 parts ZP 2 (corresponding to 346 parts resin solids =0.5 moles; corresponds to 1 mole phenolic hydroxy groups), until the content of epoxy groups corresponds to one mole. After cooling to 60° C., 15 parts (0.2 moles) MEOLA and 41 parts (0.4 moles) DMAPA are added, and the reaction is carried to an epoxy value of zero. The batch is diluted with DGDE to a solids content of 70% and has an amine value of 52 mg KOH/g.

Example 3

380 parts (2 Val) EPH II are stirred for one hour at 90° C. with 189 parts HE 1 (corresponds to 133 parts resin solids =0.5 moles) and 243 parts ZP 4 (=170 parts resin solids =0.2 moles; corresponds to 0.8 moles phe-

TABLE 1

| | Intermediate Products Type (A1) | | | | | | | | |
|---|---|---|---|---|---|---|---|---|---|
| ZP | Parts Moles | Phenol | Parts Moles | Amine | Parts PF 91/ Moles CH$_2$O | Solvent/ Solids Content % | Diisocyanate Parts (= 1 Mole) | Final Solids Content % | Molecular Weight (calculated) |
| 1 | 300 2.0 | NBP | 146 2.0 | IBA | 66/2.0 | DGDE/80 | 210 TMDI | 75 | 680 |
| 2 | 244 2.0 | DMP | 202 2.0 | HA | 66/2.0 | MIBK/80 | 222 IPDI | 75 | 692 |
| 3 | 440 2.0 | NPH | 73 1.0 | MIPA | 66/2.0 | X/85 | 174 TDI | 70 | 784 |
| | | | 73 1.0 | IBA | | | | | |
| 4 | 400 2.0 | BPF | 65 0.5 | DEAPA | 66/2.0 | MIBK/75 | 210 TMDI | 70 | 851 |
| | | | 152 1.5 | HA | | | | | |
| 5 | 94 1.0 | PH | 146 2.0 | MIPA | 66/2.0 | DGDE/80 | 590 ODI | 70 | 1074 |
| | 220 1.0 | NPH | | | | | | | |

TABLE 1A

| | Intermediate Products Type (A2) | | | | | | | | |
|---|---|---|---|---|---|---|---|---|---|
| ZP | Parts Moles | Amine | Diisocyanate Parts (= 1 Mole) | Solvent/ Solids Content % | Parts PF 91/ Mole CH$_2$O | Parts Moles | Phenol | Final Solids Content % | Molecular Weight (calculated) |
| 6 | 73 1.0 | MIPA | 210 TMDI | NMP/70 | 66/2.0 | 440 2.0 | NPH | 70 | 820 |
| | 73 1.0 | IBA | | | | | | | |
| 7 | 260 2.0 | DEAPA | 590 ODI | DGDE/70 | 66/2.0 | 300 2.0 | NPH | 70 | 1174 |
| 8 | 202 2.0 | HA | 222 IPDI | NMP/70 | 66/2.0 | 244 2.0 | DMP | 70 | 692 | nolic hydroxy groups). At 65° C., 22 parts (0.3 moles) DEA and 26 parts (0.2 moles) DEAPA and 184 parts PGME are added, and the batch is reacted at 75° C. to an epoxy value of zero. The product has a solids content of 70% and an amine value of 100 mg KOH/g.

Example 4

To a solution of 950 parts (2 Val) EPH I and 152 parts (0.8 Val) EPH II in 698 parts MIBK are added 508 parts (1.8 moles) HE 2 and 560 parts ZP 3 (corresponding to 392 parts resin solids =0.5 moles). At 110° C. the blend is reacted in the presence of 1.5 parts triethylamine to an epoxy value of zero. After cooling to 60° C., 1194 parts BM 1 (corresponding to 836 parts resin solids =3.5 moles) are added, and the reaction charge held at 60° C. until all isocyanate groups have reacted. The obtained binder is curable by thermal polymerization and has an amine value of 69 mg KOH/g and a solids content of about 70%.

Example 5

285 parts (1.5 Val) EPH II are reacted at 110° C. in the presence of 0.2 parts triethylamine with 384 parts ZP 5 (corresponding to 268 parts resins solids=0.25 moles) until one mole epoxy group is still free. At 65° C., 59 parts (0.45 moles) DEAPA and 58 parts (0.45 moles) EHA are added, and the reaction is carried at 70° C. to an epoxy value of zero.

In a further reaction step this reaction product is reacted at 70° C. with 300 parts PGME, 30 parts (0.2 moles) NBP, 160 parts (0.7 moles) BPA and 66 parts (2 moles) PF 91, until the content of free formaldehyde is less than 0.3%. The resin is diluted with PGME to a solids content of 65%. The resol-curable binder has an amine value of 86 mg KOH/g.

Example 6

304 parts (1.6 Val) EPH II are reacted at 110° C. in the presence of 76 parts PGME and 0.2 parts triethylamine with 336 parts ZP 3 (corresponding to 235 parts resin solids=0.3 moles), until 0.6 moles epoxy groups have been consumed (Component A).

In another reaction vessel, 228 parts bisphenol A (1 mole) are reacted with 260 parts DEAPA (2 moles) and 66 parts PF 91 (2 moles) in the presence of 131 parts toluol as azeotropic entraining agent until 42 parts reaction water have separated. After cooling to 30° C., 608 parts (2.0 moles) of an EHX/TDI are added within 45 minutes. As soon as the epoxy value is practically zero, the product is dissolved in 152 parts DGDE (Component B).

716 parts Component A and 1403 parts Component B are mixed with 361 parts PGME and 250 parts (1 mole) CE and reacted at 95° to 100° C. to an epoxy value of zero. The product has solids content of 70% and an amine value of 59 mg KOH/g. For processing further, 0.6 parts/100 parts resin solids of a tin catalyst (calculated as metal), for example dibutyl tindilaurate, are added.

Example 7

Analogous to Example 4, a resin solution is prepared wherein ZP 3 is replaced by 586 parts ZP 6 (corresponding to 410 parts resin solids =0.5 moles).

Example 8

760 parts (4.0 Val) EPH II are dissolved in 326 parts PGME and reacted at 100° C., in the presence of 1.0 part triethylamine with 268 parts (2 moles) DMPS at 100° C. to an acid value of below 2 mg KOH/g. Then, 1677 parts ZP 7 (corresponding to 1174 parts resin solids =1.0 mole) are added and reacted at 95° to 100° C. until all epoxy groups have reacted. The batch is diluted with PGME to a solids content of 65%. The product has an amine value of 51 mg KOH/g.

Example 9

Analogous to Example 2, a resin solution is prepared wherein ZP 2 is replaced by 494 parts ZP 8 (corresponding to 346 parts resin solids=0.5 moles).

Testing Of The Binders Of The Invention

The binder according to Examples 1 to 6 are mixed homogeneously at 60° C. with the hardener component in the resin solids quantities listed in Table 2, and a pigmented paint is made from the blend. For this purpose a coloring paste according to the following formulation consisting of 25 parts binder/hardener blend (100%)
0.25 parts carbon black
3 parts basic lead silicate pigment
36.75 parts titanium dioxide is prepared on a suitable milling equipment and blended with each 75 parts (resin solids) of the binder to form a paint.

The following hardener components were used:

Hardener Component X is a transesterification hardener on the basis of malonic acid ester made according to AT-PS 372 099, for example "Component B 2."

Hardener Component Y is a transesterification hardener on the basis of a modified malonic acid ester made according to AT-PS 379 602 (A 2531/83); for example, Example 1 corresponding to U.S. Pat. No. 4,523,007.

Hardener Component Z is a transesterification hardener on the basis of oligomer beta-hydroxy esters made according to EP-B1-00 12 463, for example, Example II(b).

After neutralization and dilution to the listed solids content, the paints were cathodically deposited onto zinc phosphated steel panels at conditions giving a dry film thickness of 20±μm and cured at the temperature listed in Table 2 for 30 minutes. In all cases, in the salt spray resistance test ASTM B-117-64, with a test duration of 700 hours, the cross incision shows corrosion of less than 2 mm. In the humidity chamber (100% relative air humidity at 50° C.), the coatings are satisfactory after 500 hours.

For testing the adhesion of PVC-materials to the cathodically deposited paint, a PVC strip, 1 cm broad and 2 mm thick, was applied to the CED-primer 30 minutes after cure and cured for 7 minutes at 140° C. (object temperature). The adhesion was tested one hour after cure.

Tear-off of the PVC layer was evaluated (grade 5=can easily be torn off; grade 1 =cannot be torn off, breaks without coming off).

The PVC materials tested were a commercially available underbody (Stankiewics 2252 of Stankiewics GmbH, Celle, BRD), and a seam sealant used in the automobile industry (Dekalin 9003 of Dekalin, Deutsche Klebstoffwerke, Hanau, BRD).

For comparison, paints were produced in the same way as described above. Comparison paint A is based on a combination of 30 parts (resin solids) of a binder according to Example 29 of U.S. Pat. No. 4,174,332 and 70 parts (resin solids) according to Example 8 of EP-B1-00 12 463. For comparison paint B, the ratio of the components was changed to 50 : 50. Comparison paint C is based on a binder combination according to Example 4 of EP-B1-00 49 369; for example, Example 4 corresponding to U.S. Pat. No. 4,356,276. None of the binders contains substituted urea groups.

The comparison of the paints, having a solids content of about 18%, can be seen from Table 2. In this table, designations with respect to resins refer to resin solids.

TABLE 2

| Paint Binder | 1 | 2 | 3 | 4 | 5 | 6 | 7 | 8 | 9 |
|---|---|---|---|---|---|---|---|---|---|
| Example | | | | | | | | | |
| 1 | 80 | | | | | | | | |
| 2 | | 70 | | | | | | | |
| 3 | | | 75 | | | | | | |
| 4 | | | | 100 | | | | | |
| 5 | | | | | 100 | | | | |
| 6 | | | | | | 100 | | | |
| 7 | | | | | | | 100 | | |
| 8 | | | | | | | | 75 | |
| 9 | | | | | | | | | 70 |
| Hardener Component | | | | | | | | | |
| X | | 30 | | | | | | 25 | |
| Y | 20 | | | | | | | | 30 |
| Z | | | 25 | | | | | | |
| Neutralization mMol HCOOH/100 g | 40 | 35 | 40 | 45 | 30 | 40 | 45 | 40 | 35 |
| Deioniz. Water | 595 | 608 | 606 | 589 | 584 | 595 | 589 | 584 | 608 |
| Stoving Conditions 30 min/°C. | 165 | 180 | 170 | 165 | 160 | 150 | 165 | 170 | 180 |

Evaluation of Results

| Grading | Underbody Paint No. | Seam Sealant Paint No. |
|---|---|---|
| 1 | 4, 5, 6, 7 | 3, 5, 6 |
| 2 | 2, 3, 8, 9 | 1, 4, 7, 8 |
| 3 | 1 | 2, 9 |
| 4–5 | Comparison paint A | Comparison paint A, C |
| 5 | Comparison paint B, C | Comparison paint B |

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cationic epoxy resins modified through chain prolongation, characterized in that a reaction product
   (A1) of two moles of an aminoalkylation product, carrying one NH-group, obtained through reaction of a phenol carrying at least one formaldehyde-reactive site, with a primary amine and formaldehyde and one mole of a diisocyanate,
   or a reaction product
   (A2) of one mole of a substituted urea obtained from one mole of a diisocyanate compound and two moles of a primary amine, two moles of formaldehyde, and two moles of a phenol having at least one formaldehyde-reactive site
is reacted with
   (B) one mole per phenolic hydroxy group of a diepoxy compound through etherification of the phenolic hydroxy groups, and
   (C) the remaining epoxy groups are reacted with amine compounds or carboxy compounds whereby the final product carries basic nitrogen groups in a quantity corresponding to an amine value of from 35 to 150 mg KOH/g.

2. Process according to claim 1 further characterized in that a primary-tertiary diamine is used as the primary amine in the preparation of reaction products (A1) and (A2).

3. Process according to claim 1 further characterized in that the reaction of the amines or carboxy compounds is carried out simultaneously with, or after, the reaction of the epoxy compounds with reaction products (A1) or (A2).

4. Process according to claim 2 further characterized in that the reaction of the amines or carboxy compounds in step (C) is carried out simultaneously with, or after, the reaction of the epoxy compounds with reaction products (A1) or (A2).

5. Process according to claim 3 further characterized in that a carboxy compound which is a semiester of a dicarboxylic acid with hydroxy(meth)acrylates is utilized in step (C).

6. Process according to claim 4 further characterized in that a carboxy compound which is a semiester of a dicarboxylic acid with hydroxy(meth)acrylates is utilized in step (C).

7. Use of the products produced according to claim 1 as binders in stoving paints.

8. Use of the products produced according to claim 1 as binders in cathodically depositable electrodeposition paints.

9. Cationic epoxy resin comprising the reaction product of a diepoxy resin with
   (A1) a reaction product of two moles of an aminoalkylation product, carrying one NH-group, obtained through the reaction of a phenol carrying at least one formaldehyde-reactive site, with a primary amine and formaldehyde and one mole of a diisocyanate,
   or
   (A2) reaction products of one mole of a substituted urea obtained from one mole of a diisocyanate compound and two moles of a primary amine, two moles of formaldehyde, and two moles of a phenol having at least one formaldehyde-reactive site,
the ratio of diepoxy resin to reaction product (A1) or (A2) being on the basis of one mole of the diepoxy resin per phenolic hydroxy group on the reaction product of (A1) or (A2).

10. The cationic epoxy resin of claim 9 wherein the reaction product is further reacted with an amine compound or carboxy compound to provide an epoxy resin substantially free of epoxy groups, with the resin carrying basic nitrogen groups in a quantity corresponding to an amine value of from 35 to 150 mg KOH/g.

11. The cationic epoxy resin of claim 10 wherein the primary amine of (A1) and (A2) is a primary-tertiary diamine.

* * * * *